United States Patent [19]

Zeuner

[11] Patent Number: 5,787,786
[45] Date of Patent: Aug. 4, 1998

[54] DUAL HYDRAULIC OSCILLATOR FOR THE RECIPROCATING CUTTER OF AN AGRICULTURAL MACHINE

[75] Inventor: Kenneth W. Zeuner, New Hope, Pa.

[73] Assignee: Sauer-Sundstrand - Control Concepts, Newtown, Pa.

[21] Appl. No.: 722,908

[22] Filed: Sep. 27, 1996

Related U.S. Application Data

[60] Provisional application No. 60/017,210 May 9, 1996.

[51] Int. Cl.[6] ............................................. F15B 11/22
[52] U.S. Cl. ........................... 91/171; 91/189 A; 60/374; 56/296
[58] Field of Search ..................... 91/171, 178, 189 A, 91/290, 296, 297, 298, 319, 536; 60/374; 56/296

[56] References Cited

U.S. PATENT DOCUMENTS

| | | | |
|---|---|---|---|
| 2,950,599 | 8/1960 | Burt | 60/374 |
| 3,050,809 | 8/1962 | Kupke | 91/171 |
| 3,339,397 | 9/1967 | Heimel | 91/536 |
| 3,677,604 | 7/1972 | Leyrat . | |
| 3,770,322 | 11/1973 | Cobb et al. . | |
| 3,786,723 | 1/1974 | Fruehauf . | |
| 3,823,534 | 7/1974 | Bornzin et al. . | |
| 3,846,991 | 11/1974 | Wisotsky . | |
| 3,866,693 | 2/1975 | Century . | |

(List continued on next page.)

FOREIGN PATENT DOCUMENTS

| | | | |
|---|---|---|---|
| 861530 | 1/1953 | Germany | 91/536 |
| 226589 | 12/1924 | United Kingdom . | |
| 667422 | 2/1952 | United Kingdom . | |
| 961780 | 6/1964 | United Kingdom . | |
| 1250649 | 10/1971 | United Kingdom . | |

OTHER PUBLICATIONS

"Turcon® Glyd Ring® T", Busak Shamban, p. 3, (date unknown, prior to May 9, 1996).
"Paramount Sealing System Philosophy", Busak Shamban, p. 2, (date unknown, prior to May 9, 1996).
"Turcon® Stepseal® K", Busak Shamban, p. 3, (date unknown, prior to May 9, 1996).
"Busak+Shamban Sealing System Philosophy", Busak Shamban, p. 2, (date unknown, prior to May 9, 1996).

*Primary Examiner*—F. Daniel Lopez
*Attorney, Agent, or Firm*—Ratner & Prestia

[57] ABSTRACT

A dual hydraulic oscillator for the reciprocating cutter of an agricultural machine is provided. The dual oscillator has two pistons reciprocating in opposite directions and a single pilot valve, with resynchronization performed twice per cycle of the oscillator. Also provided is a single or dual hydraulic oscillator comprising a cylinder having first and second opposed ends. A reversing pilot valve is provided for controlling flow of pressurized fluid to at least one of the first and second cylinder ends. The pilot valve includes first and second pilot passages for controlling the reversing operation of the pilot valve. A piston reciprocates between first and second positions in the cylinder. The piston has an inner bore. The bore has first and second circumferential logic grooves. An inner logic mechanism is slidably received in the bore. The inner logic mechanism has a first coupling mechanism for fluidly coupling the logic grooves to the pressurized fluid and a second coupling mechanism for fluidly coupling the logic grooves to the first and second pilot passages. The first coupling mechanism is fluidly coupled to the second coupling mechanism by the first logic groove, and the second coupling mechanism is fluidly coupled to the first pilot passage, exclusively when the piston is in the first position. The first coupling mechanism is fluidly coupled to the second coupling mechanism by the second logic groove, and the second coupling mechanism is coupled to the second pilot passage, exclusively when the piston is in the second position, thereby to alternately reverse the pilot valve to change the fluid flow to at least one of the first and second cylinder ends for producing the reciprocation of the piston.

12 Claims, 12 Drawing Sheets

U.S. PATENT DOCUMENTS

| | | |
|---|---|---|
| 3,873,159 | 3/1975 | Dabell et al. . |
| 3,897,975 | 8/1975 | Cobb et al. . |
| 4,052,107 | 10/1977 | Hay . |
| 4,080,000 | 3/1978 | Paurat . |
| 4,120,202 | 10/1978 | Range et al. . |
| 4,121,499 | 10/1978 | Hay . |
| 4,147,228 | 4/1979 | Bouyoucos . |
| 4,165,042 | 8/1979 | Peterson . |
| 4,259,029 | 3/1981 | Koehl . |
| 4,280,396 | 7/1981 | Zeuner et al. . |
| 4,363,519 | 12/1982 | Howard . |
| 4,391,414 | 7/1983 | Reiter . |
| 4,550,785 | 11/1985 | Hibbard et al. . |
| 4,554,624 | 11/1985 | Wickham et al. . |
| 4,580,640 | 4/1986 | Boldt . |
| 4,688,439 | 8/1987 | Cureton et al. . |
| 4,891,115 | 1/1990 | Shishkin et al. . |
| 4,900,093 | 2/1990 | Krone et al. . |
| 5,048,394 | 9/1991 | McLevige et al. . |
| 5,113,966 | 5/1992 | Gregory et al. . |
| 5,145,279 | 9/1992 | Larcheron et al. . |
| 5,158,064 | 10/1992 | Robnett et al. . |
| 5,248,123 | 9/1993 | Richeson et al. . |
| 5,273,217 | 12/1993 | Bartels et al. . |
| 5,408,768 | 4/1995 | Karani . |

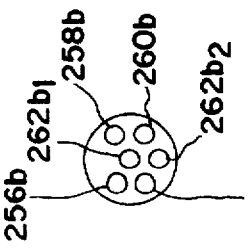
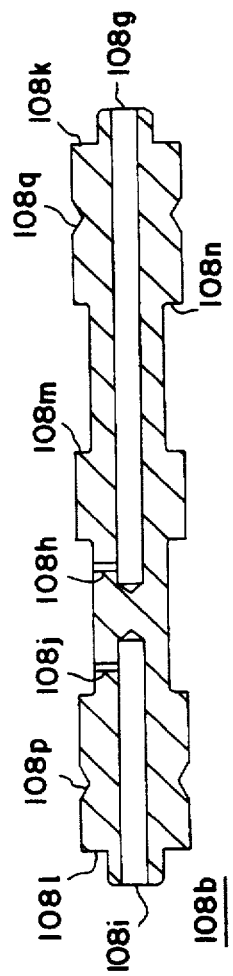
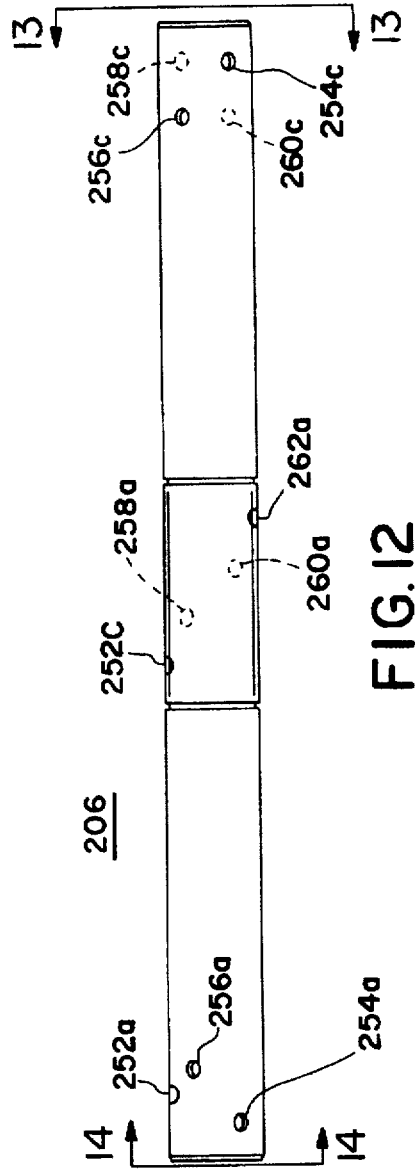
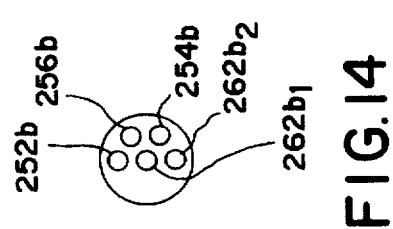

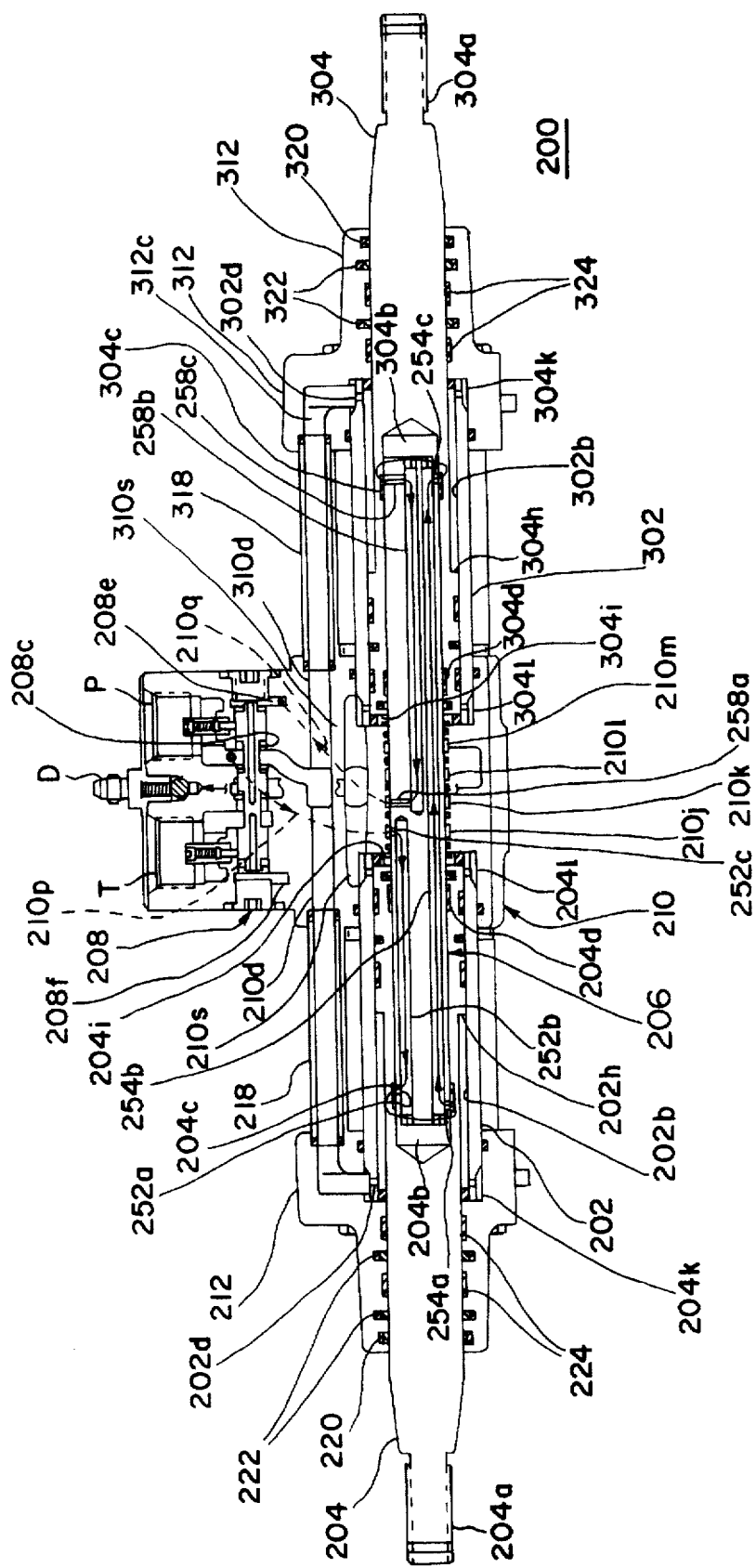
FIG. IIA

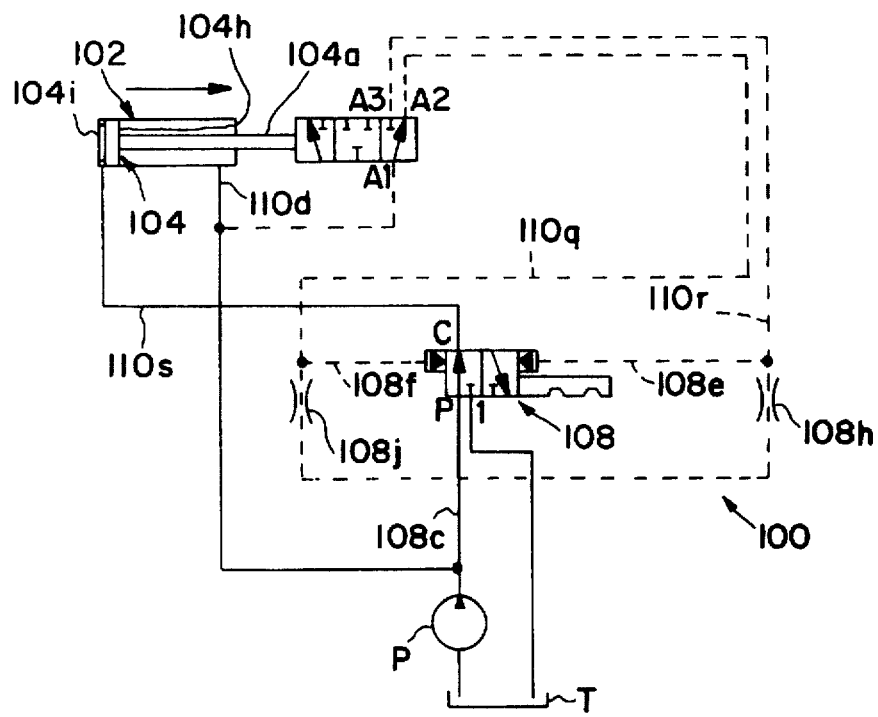
F I G. 17
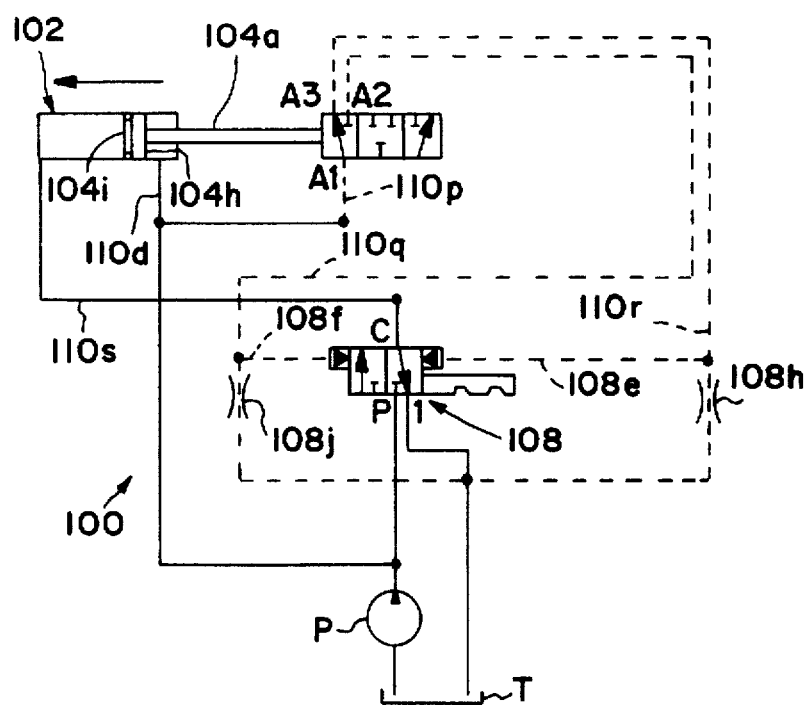
F I G. 18

5,787,786

DUAL HYDRAULIC OSCILLATOR FOR THE RECIPROCATING CUTTER OF AN AGRICULTURAL MACHINE

This application claims the benefit of U.S. Provisional application Ser. No. 60/017,210 filed May 9, 1996.

FIELD OF THE INVENTION

The present invention relates generally to electro-mechanical control systems, and in particular to hydraulic oscillators for use in agricultural equipment.

BACKGROUND OF THE INVENTION

Hydraulic oscillators have been described, for example, in U.S. Pat. No. 4,280,396 to Zeuner et al (hereinafter, the '396 Patent), which discloses an oscillator suitable for use in a cutter bar mechanism. Such a cutter bar is commonly used in agricultural equipment, such as a combine or forage harvester. The '396 patent is expressly incorporated by reference herein.

The hydraulic oscillator comprises a reciprocating piston within a cylinder controlled by a reversing pilot valve, such as a spool valve. In the '396 Patent, the piston has logic grooves at both ends, on its outer peripheral surface. When the piston reaches the fully extended or fully retracted position, the logic grooves on the outside of the piston line up with a corresponding groove or passage in the cylinder. A fluid path is established, to provide pressurized fluid to switch the pilot valve, thereby to reverse the direction of the main piston, creating the reciprocating motion.

The oscillator described in the '396 Patent has disadvantages that have limited its use by industry. One disadvantage is that the configuration of grooves on the outside of the piston prevent the use of effective hydraulic seals to prevent leakage around the outer circumference of the piston; the inner cylinder grooves which come into play with the piston grooves would cut the seals and limit their life. As a result, the hydraulic fluid leaks past the piston, creating heat and reducing efficiency to about 80%.

Another disadvantage of the oscillator in the '396 Patent is the size and complexity of the housing and the pilot valve that are required to implement the design described therein. The pilot valve in the '396 Patent is a four way spool valve having a length approximately as long as the actuating cylinder itself. As a result, the housing is large and heavy.

Still another disadvantage of the oscillator in the '396 patent is that it is a single oscillator, having a single piston, with application to limited loads. For large loads (e.g., large cutter bars for use in grass or crop cutter applications), the unbalanced load associated with a single reciprocating cutter bar becomes too large, with an unacceptable level of mechanical vibration.

Thus, the hydraulic oscillator is still not used in most common grass and crop cutting machines. It is still common to drive reciprocating equipment using mechanically driven mechanisms. For example, in the crop cutting apparatus of an agricultural harvester, a reciprocating motion is provided by a belt-driven "wobble box". The wobble box converts the motion of the driving belt into a linear, reciprocating motion.

Wobble boxes have left much to be desired. Perhaps their greatest problem is poor reliability. Wobble boxes typically must be completely rebuilt or replaced after only about 400-500 hours, which can result in the failure of the cutter during a harvest, extended down time, and the loss of crops.

Another problem with wobble boxes is encountered when relatively large equipment is involved. For example, when using a 32 foot sickle bar (cutter bar) (commonly used in harvesters), the reciprocating motion of the cutter can cause the whole vehicle to shake or experience shock or jerk.

Another problem with wobble boxes is that it is not desirable to use multiple wobble boxes and divide the sickle bar (cutter bar) into multiple bar sections, because the multiple wobble boxes would be out of synchronization with each other, and would create unbalanced vibration.

SUMMARY OF THE INVENTION

The present invention is a dual hydraulic oscillator for actuating the reciprocating cutter bar mechanism of an agricultural machine.

According to another aspect, the invention is a dual hydraulic oscillator, including: first and second pistons oriented in opposite directions. A reversing pilot valve controls flow of pressurized fluid to alternately extend and retract both of the first and second pistons. An extension synchronizing mechanism synchronizes the extension of the first and second pistons; and a retraction synchronizing mechanism synchronizes the retraction of the first and second pistons.

According to a further aspect of the invention, the extension and retraction synchronizing mechanisms include first respective first and second fluid paths for applying pressurized fluid to reverse the operation of the pilot valve. The first fluid path is blocked unless the first and second pistons are both simultaneously in a retracted position. The second fluid path is blocked unless the first and second pistons are both simultaneously in an extended position. The first and second fluid paths pass through a central logic tube. The central logic tube has first and second ends slidably received in the first and second pistons, respectively.

BRIEF DESCRIPTION OF THE FIGURES

FIG. 9 is an enlarged view of the pilot spool shown in FIG. 3.

FIG. 11A is a logic diagram showing the operation of the dual oscillator shown in FIG. 10, with the pistons retracted.

FIG. 12 is an elevation view of the logic tube shown in FIG. 11A.

FIGS. 13 and 14 are end views of the logic tube shown in FIG. 12.

FIG. 17 is a schematic diagram of the single oscillator of FIG. 7 when the cylinder begins to extend.

FIG. 18 is a schematic diagram of the oscillator of FIG. 8 retracting.

DETAILED DESCRIPTION

Figure 1:
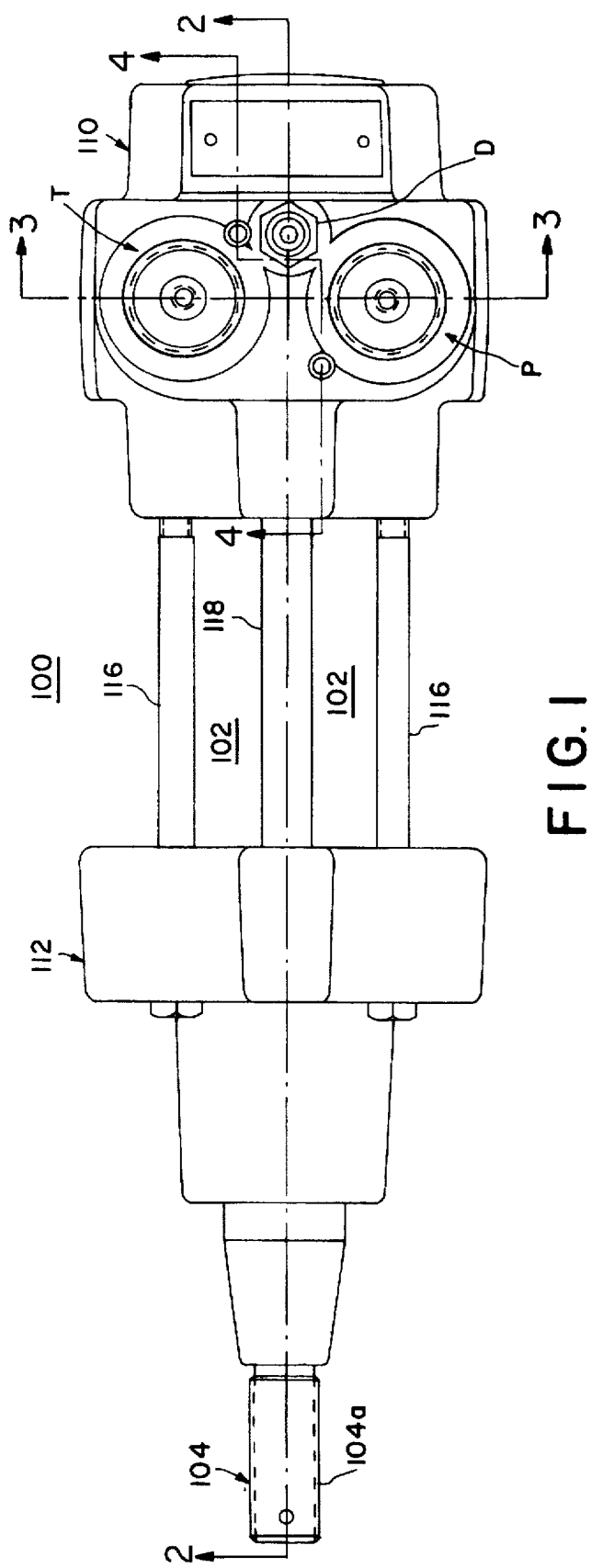
FIG. 1 is a plan view of a first exemplary hydraulic oscillator according to an aspect of the invention.

Two major aspects of the present invention are described in detail below:

I. A dual hydraulic oscillator which may advantageously be used for actuating the reciprocating cutter bar mechanism of an agricultural harvester. In systems having large, massive cutters, which may weigh up to about 30 pounds, the use of a single oscillator to actuate the cutter imparts considerable inertia, which could cause unbalanced vibration in the system. A dual oscillator provides a pair of pistons which simultaneously extend in opposite directions, and which simultaneously retract. A dual oscillator does not impart the unbalanced load that would be imparted to the system by a single hydraulic oscillator actuating a large massive cutter; and II. A hydraulic oscillator having central logic passages, allowing the use of a sealed piston that produces substantially zero leakage and can withstand longitudinal loading.

The detailed structure and operation of the exemplary dual hydraulic oscillator according to the present invention is most easily explained by first referring to the central logic passage design and operation in a single oscillator. The exemplary dual oscillator is constructed primarily from the same components used in the single oscillator, as explained below.

I. HYDRAULIC OSCILLATOR HAVING CENTRAL LOGIC PASSAGES

The present invention is first explained by reference to a hydraulic oscillator 100, and to reciprocating systems actuated by oscillator 100. Oscillator 100 is designed to provide continuous reciprocating motion at very high volumetric efficiency, when supplied with pressurized hydraulic fluid from a separate hydraulic pressure source. A typical application may comprise actuating the cutting bar for a grain crop harvester or a grass cutter.

FIGS. 17 and 18 are schematic diagrams of a first exemplary oscillator.

A pilot valve 108 acts as a switch causing oscillator 100 to either extend or retract the cylinder rod (shaft) 104a of piston 104. In the fully extended position (FIG. 18), pilot valve 108 trips to the retract setting, redirecting fluid so that rod 104a retracts. In the fully retracted position (FIG. 17), pilot valve 108 trips again and reroutes the pressurized fluid to extend rod 104a.

As shown in FIGS. 17 and 18, the oscillator comprises two sections: a direction control valve 108 and a single rod, double acting hydraulic cylinder 102. FIG. 17 shows the system state when the piston 104 of cylinder 102 begins to extend. Pressurized fluid is constantly transmitted via passage 110d to side 104h of piston 104. This flow applies a force tending to cause piston 104 of cylinder 102 to retract.

A control valve 108 controls the flow of pressurized fluid to the second side 104i of piston 104 via passage 110s. In the position shown in FIG. 18, control valve 108 provides fluid to cause extension of piston 104 of cylinder 102. The area of side 104i is greater than the area of side 104h (In the exemplary embodiment, the ratio of areas 104i:104h is 2:1). Thus, in the state shown in FIG. 17, a greater force is applied to side 104i, causing piston 104 of cylinder 102 to extend.

Control of valve 108 is effectuated by the pilot control passages 110q and 10r. These ports are designated A1–A5 in FIGS. 17 and 18. In the exemplary embodiment, these ports are determined by the holes in a logic tube 106 (described below with reference to FIGS. 1–9), which are equal. The effect is that the same force is applied to shift pilot 108 in either direction.

Bleed orifices 108h and 108j couple the control passages 110q and 110r to tank while pilot valve 108 is in between positions.

FIG. 18 shows oscillator 100 after control valve 108 has tripped to the reverse position. Pressurized fluid is still constantly transmitted via passage 110d to side 104h of piston 104.

In FIG. 18, control valve 108 controls the flow to couple the second side 104i of piston 104 to tank via passage 110s. The pressure forces applied to side 104h is no longer opposed by application of pressurized fluid to the other side of cylinder 102, so that the piston 104 of cylinder 102 retracts.

STRUCTURE

Figure 2:
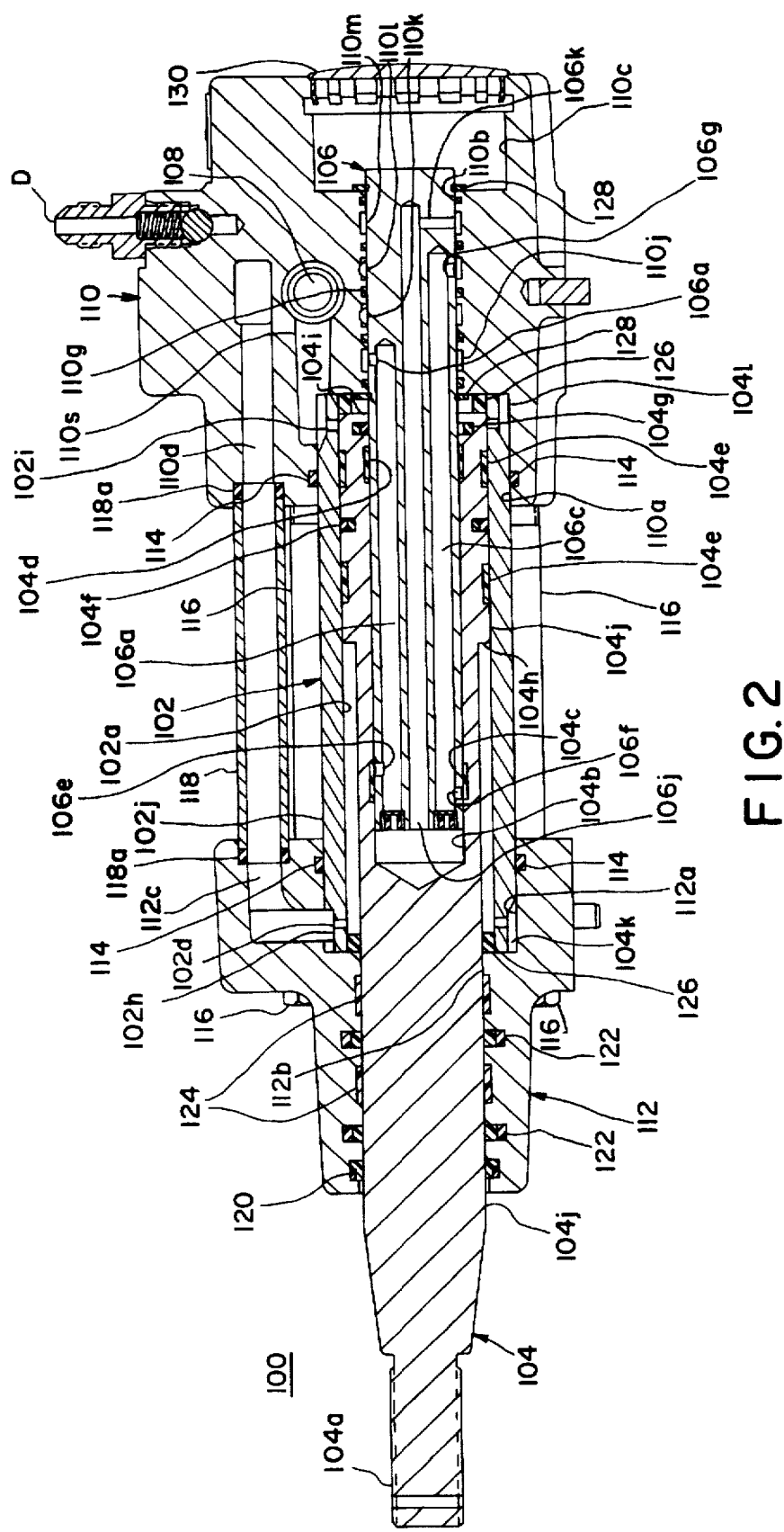
FIG. 2 is a cross sectional view of the oscillator shown in FIG. 1, taken along section line 2—2.
Figure 3:
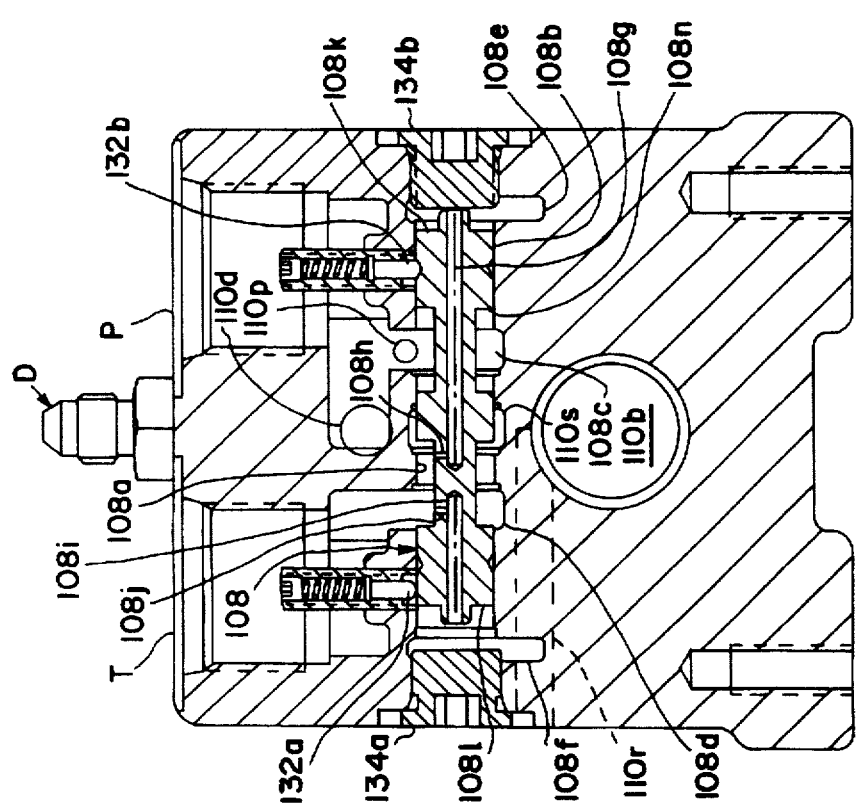
FIG. 3 is a cross sectional view of the oscillator shown in FIG. 1, taken along section line 3—3.

FIG. 1 is a plan view of an exemplary single piston hydraulic oscillator 100. FIG. 2 is a cross sectional view of oscillator 100, taken along section line 2—2, and FIG. 3 is a cross sectional view of oscillator 100, taken along section line 3—3. Oscillator 100 has three main sections: a valve body 110, an end cap 112, and a cylinder tube 102 (hereinafter referred to as, "cylinder 102") mounted between body 110 and end cap 112. A piston 104 is slidably housed within cylinder 102. Piston 104 is integral with a shaft 104a which transmits reciprocating motion to the equipment (not shown) to be driven. Pressurized fluid is constantly applied to a shaft-side face 104h (also referred to herein as the "first" face 104h) of piston 104. A slidable spool pilot valve 108, also housed within body 110, directs pressurized fluid from the external pressure source so that the second face 104i of piston 104 is alternately fluidly coupled to the pressurized fluid when spool 108 is in a first position (shown in FIG. 8) and to tank when spool 108 is in a second position (shown in FIG. 7).

Figure 4:
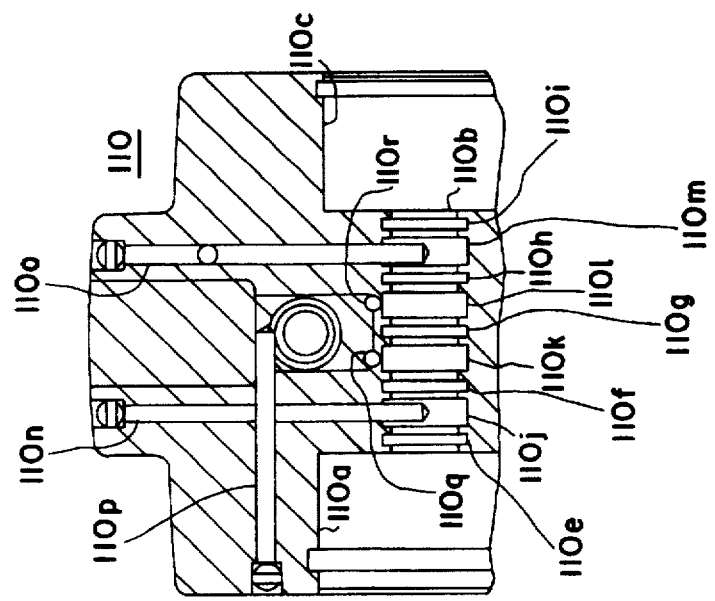
FIG. 4 is a cross sectional view of the valve body of the oscillator shown in FIG. 1, taken along section line 4—4.
Figure 6:
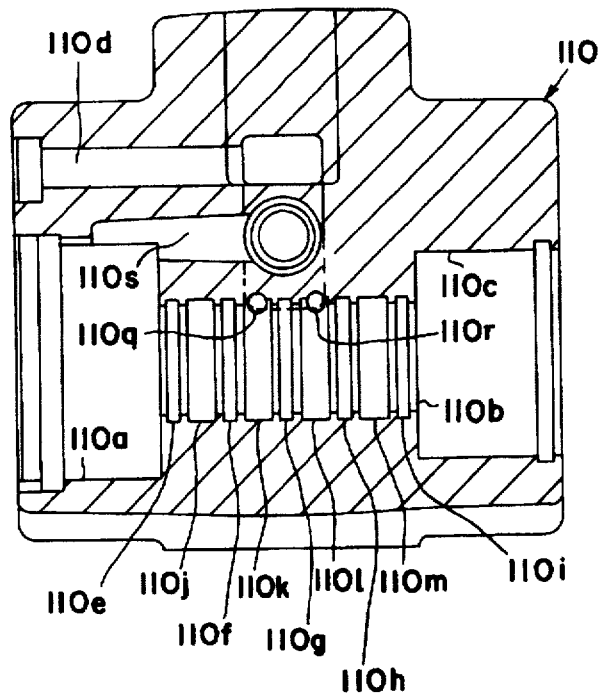
FIG. 6 is a cross sectional view of the valve body of the oscillator shown in FIG. 1, taken along section line 3—3.
Figure 7:
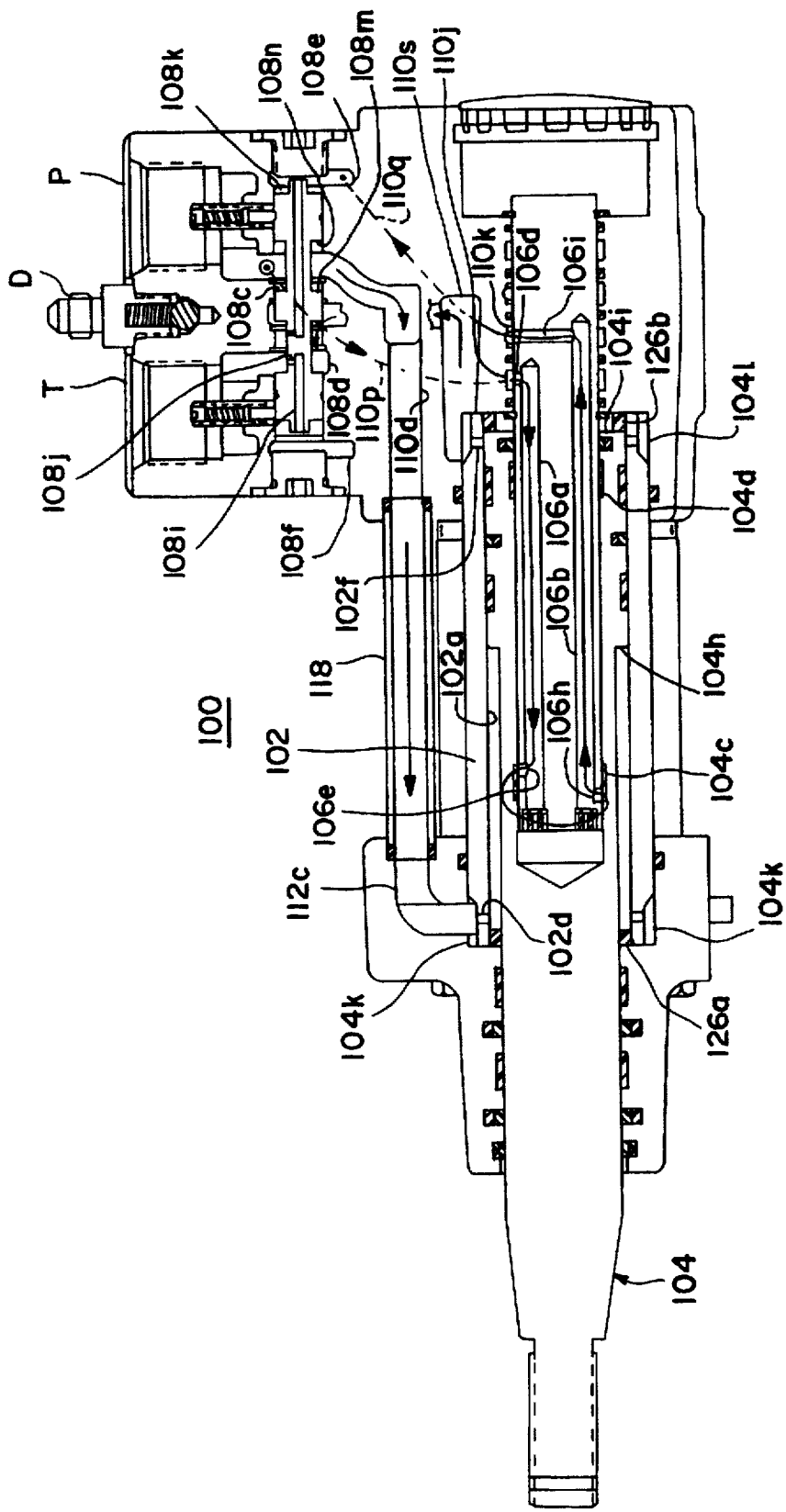
FIG. 7 is a logic diagram showing the operation of the oscillator of FIG. 1, with the piston retracted.
Figure 8:
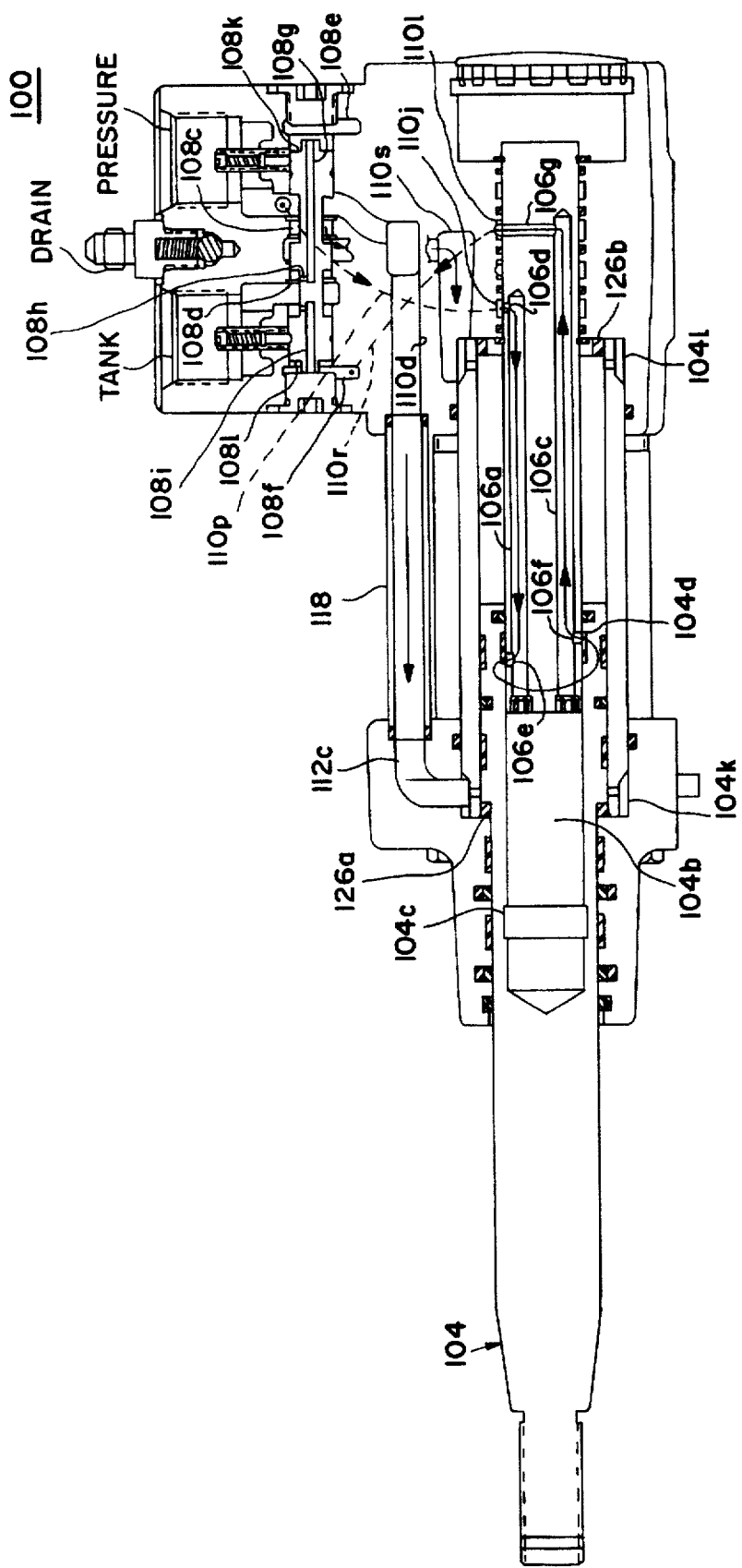
FIG. 8 is a logic diagram showing the operation of the oscillator of FIG. 1, with the piston extended.

FIG. 6 is a cross sectional view of the valve body 110, taken along the same section line 3—3 as shown in FIG. 3. Body 110 has a counterbore 110a, in which one end of cylinder 102 is mounted, and a longitudinal bore 110b, in which one end of logic tube 106 is mounted. Bore 110b has a plurality of undercuts (circumferential grooves) 110j, 110k, 110l, and 110m. Groove 110j is coupled to the pressurized fluid by a passages 110n and 110p which are shown in FIG. 4. Groove 110k is coupled to one side of pilot spool 108 via passage 110q as shown in FIG. 7. Groove 110l is coupled to the other side of pilot spool 108 as shown in FIG. 8. Groove 110m is coupled to the drain D by a fluid path 110o shown in FIG. 4. A plurality of o-ring seals 110e–110i isolate grooves 110j–110m from one another and from counterbores 110a and 110b. A pressure passage 110d provides pressurized fluid to the shaft-side (first) face 104h of piston 104 at all times.

Referring again to FIG. 2, end cap 112 has a counterbore 112a. A first end 102b of cylinder 102 is sealingly mounted in counterbore 112a, using an o-ring seal 114. Body 110 has a counterbore 110a. The second end 102c of cylinder 102 is sealingly mounted within counterbore 110a using an o-ring 114. A set of bolts 116 (or other equivalent fasteners) connect body 110, end cap 112 and cylinder 102 together as an integral unit, with cylinder 102 acting as a spacer to fix the distance between body 110 and cap 112. A through tube 118 provides a fluid path between a passage 110d (which is fluidly coupled to the pressure inlet P) and a passage 112c in end cap 112. Passage 112c opens into counterbore 112a.

End cap 112 has a longitudinal bore 112b. A portion 104j of piston 104 is slidably received by bore 112b. In the exemplary embodiment, a leak proof sealing system is formed from three parts which have been typically been used in airplane struts. A ring/excluder assembly 120 is a long-life, low pressure ring device for wiping dirt off of piston 104 and keeping dirt from entering end cap 112. Assembly 120 may be a TURCON® EXCLUDER® ring manufactured by Busak+Shamban of California. Next a zero-leak pressure seal 122 is provided. Seal 122 is a low friction, high wear resistance, high velocity, unidirectional seal, which may be a TURCON® STEPSEAL® K seal manufactured by Busak+Shamban. Next a wide area wear pad 124 is used, which may be a ZURCON® wear bearing manufactured by Busak+Shamban. A second pressure seal 122 is provided, which may be a TURCON® or ZURCON® STEPSEAL® K seal manufactured by Busak+Shamban. Lastly, a second wear bearing 124 is provided provided.

The exemplary seals 120, 122 and wear rings 124 are selected to accommodate lateral loading of the piston (for example, to support the weight of a cutting bar during installation) of 20 to 30 pounds (about 9 to 14 kilograms). Moreover, exemplary seals 120, 122 and wear rings 124 are preferably selected to have a life of about 2000 hours of use, at 16 cycles (32 strokes) per second, for a total of about 111.6 million cycles.

Figure 5:
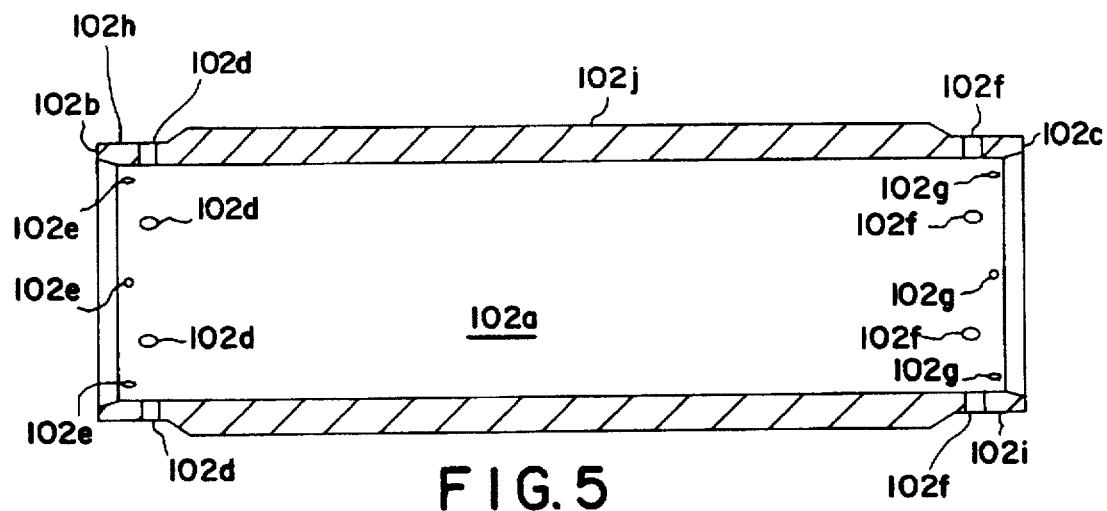
FIG. 5 is a cross sectional view of the cylinder tube shown in FIG. 1.

FIG. 5 is a cross sectional view of cylinder 102. Cylinder 102 has an outer diameter 102j sized to fit bore portion 110a. Reduced diameter sections 102h and 102i are provided at the ends 102a and 102b of cylinder 102. Respective annular regions 104k and 104l are formed between bore section 110a and reduced diameter sections 102h and 102i of cylinder 102.

At each end 102a, 102b, a plurality of holes 102d–102g are provided. Holes 102d and 102e act as orifices to control the flow of fluid and dampening fluid velocity as a fluid dashpot between the inside 102a of cylinder 102 and annular regions 104k and 104l. Holes 102d and 102e are distributed in the longitudinal direction. In the exemplary embodiment, holes 102d are all at a first distance from end 102b, and holes 102e are all at a second distance from end 102b. Similarly, holes 102f and 102g are placed at respectively different distances from end 102c.

Referring again to FIG. 2, piston 104 has a large diameter portion 104j which is slidably and sealingly received in the inner bore 102a of cylinder 102. Two urethane springs 126a and 126b are provided at the ends of cylinder 102. Urethane springs 126a, 126b act as dash pot dampeners to stop piston 104, and to prevent shock, at either limit of its travel, and reverse the direction of piston 104. A pair of wear rings 104e is provided on the outer circumference of large diameter portion 104j. Wear rings may be of the same type as wear bearings 124, described above. Wear rings 104e ensure frictionless sliding of piston 104 inside cylinder 104. In between the wear rings 104e, a long-life, low friction seal 104f is provided. Seal 104f may be, for example, a Turcon® Glyd Ring® T, seal manufactured by Busak+Shamban.

Piston 104 has two pressure faces 104h and 104i on its large diameter section. In the exemplary embodiment, pressurized fluid is always applied the face 104h (the face nearer shaft 104a). Pressure is only applied to the other face 104i when piston 104 is extending. Face 104i communicates with tank while the piston is retracting. To keep the same velocity profile during retraction as during extension, the same total longitudinal force is applied to piston 104 during extension and retraction. According to one aspect of the invention, the second face 104i has twice the pressure bearing area as the first face 104h.

The reason for this area ratio is as follows. Assume that the pressure at port P is P, the area of the first face 104h is A, and the area of the second face 104i is 2A. A force of AP is always applied on the first face 104h. When the second face 104i is open to tank, the force on the second face 104i is zero, so the total force acting on piston 104 is AP. When the second face 104i is in communication with the pressurized fluid, the pressure force on the second face is 2AP (in the opposite direction), and the total force acting on both faces is 2AP–AP=AP. Thus, the total forces in both directions are the same, and the acceleration and velocity profiles are the same.

The advantage of the above approach is it allows the use of a simple three-way pilot valve 108, as described below.

Piston 104 has an inner bore 104b for receiving a logic tube 106, which is described below. Piston 104 has a pair of undercuts 104c and 104d, which form logic grooves for completing fluidic logic paths when piston 104 is in specific positions, as explained in greater detail below.

One end of logic tube 106 is mounted in bore 110b of body 110, using a snap ring 128. The other end of logic tube 106 is slidably and sealingly received by the inner bore 104b of cylinder 104.

Logic tube 106 is a means for providing position feedback. A fully extended or fully retracted state is sensed when fluid flows as a result of an alignment between a logic hole in logic tube 106 and a groove 104c or 104d in piston 104. Logic tube 106 has a plurality of passages 106a, 106c and 106j (shown in FIG. 2), and 106b (shown in FIG. 7). Logic holes 106d and 106e connect passage 106a to the exterior surface of logic tube 106. Logic holes 106h and 106i (shown in FIG. 7) connect passage 106b to the exterior surface of logic tube 106. As best seen in FIG. 7, logic holes 106d is aligned with groove 110j, and logic hole 106i is aligned with groove 110k. When piston 104 is in the fully retracted position (referred to herein as the "first position"), logic holes 106e and 106h are both aligned with groove 104c of piston 104, completing a fluid path between groove 110j and groove 110k.

FIGS. 2 and 8 show logic holes 106f and 106g connecting passage 106c to the exterior surface of logic tube 106. As best seen in FIG. 8, when piston 104 is in the fully extended position (referred to herein as the "second position"), logic holes 106e and 106f are both aligned with groove 104d of piston 104, completing a fluid path between groove 110j and groove 110l.

Passage 106j (FIG. 2) of logic tube 106 is coupled to the drain via groove 110m. When piston 104 retracts from the extended position, fluid in bore 104b is conducted to the drain D via passage 106j, hole 106k, groove 110m, and passage 110o (shown in FIG. 4). Drain D may be a conventional spring loaded steel ball valve installed with an o-ring seal, the single oscillator 100, a finishing plug 130 is placed in counterbore 110c.

FIG. 3 shows the pilot valve 108. In the exemplary embodiment, pilot 108 is a simple three way spool valve.

Pilot valve 108 is defined by a spool 108b slidably located in the pilot valve bore 108a (FIG. 9 is an enlarged cross sectional view of spool 108b). In FIG. 3, end caps 134a and 134b seal pilot valve bore 108a and limit the motion of spool 108b. With spool 108b positioned at the right hand end of bore 108a as shown in FIGS. 3 and 8, fluid flows from pressure inlet port P into chamber 108c. Chamber 108c constantly provides pressurized fluid to passages 110d and 110p of body 110. As shown in FIG. 2, passage 110d constantly provides pressurized fluid to the first face 104h of piston 104 via through tube 118, passage 112c, annular chamber 104k, and metering holes 102d and/or 102e. Passage 110p (FIG. 4) constantly provides pressurized fluid to passage 106a of logic tube 106, via passage 110n (FIG. 4), groove 110j, and hole 106d.

Referring again to FIG. 3, a further chamber 108d in pilot 108 is constantly connected to the tank port T. As shown in FIGS. 2 and 3, a passage 110s connects pilot 108 with the annular region 104l between the inner end of cylinder 102 and counterbore 110a. With pilot spool 108b positioned at the far right as shown in FIGS. 3 and 7, chamber 108d is placed in fluid communication with passage 110s, so that annular region 104l is in fluid communication with tank port T. With pilot spool 108b positioned at the far left as shown in FIG. 8, chamber 108c is placed in fluid communication with passage 110s, so that pressurized fluid is provided to annular region 104k.

Pilot spool 108b has an end passage 108g which is open to chamber 108e at the right end of spool 108b. An orifice 108h bleeds fluid out from end passage 108g to tank when spool 108b moves to the right. Similarly, spool 108b has an end passage 108i which is open to chamber 108f at the left end of spool 108b. An orifice 108j bleeds fluid out from end passage 108i to tank when the spool moves to the left.

A passage 110r (shown in phantom in FIG. 3) fluidly connects left end chamber 108f with logic groove 110l (shown in FIG. 4). A similar passage 110q (shown in FIG. 4) connects right end chamber 108e with logic groove 110k.

Pilot spool 108b has two détente grooves 108p and 108q. When pilot spool 108b is in its left position, a spring loaded détente ball 132a engages détente groove 108p of pilot spool 108b. Similarly, when pilot spool 108b is in its right position, a spring loaded détente ball 132b engages détente groove 108q of pilot spool 108b. Thus, pilot spool 108b does not shift position if minor pressure transients occur in the pressurized fluid. Additionally, because both bleed orifices 108h and 108j are always open to tank, they ensure that pressure transients which occur while pilot spool 108b is in midtravel between left and right positions do not effect spool 108b.

As noted above, by transmitting the pressurized fluid to one end of piston 104 at all times, and maintaining the ratio between the first and second driving areas of the piston 104h:104i at ½ allows the use of a simple three way spool pilot valve 108. Pilot valve 108 provides a simpler design and simpler fabrication technique than was practical in the prior art. In the prior art oscillator of U.S. Pat. No. 4,280,396, for example, the pilot valve extends the entire length of the main oscillator, resulting in a longer main housing. According to the present invention, the pilot is substantially shorter than the four way pilot valve used in U.S. Pat. No. 4,280,396. Pilot 108 may be positioned in a direction transverse to the main piston 104. As a result, there is no need for the long complex housing which formed the main body in the oscillator in U.S. Pat. No. 4,280,396. According to the present invention, a smaller housing may be used for body 110, and oscillator 100 can be formed in three sections: body 110, cylinder 102 and end cap 112.

Because oscillator is formed in three sections, it is easier to perform machining operations on parts that would be hidden if a single massive housing were used. Assembly is also simplified. The three sections may, for example, be fastened together with bolts 116.

OPERATION

Operation of oscillator 100 is now described with reference to FIGS. 7 and 8. FIGS. 7 and 8 are logical representations of oscillator 100, in which the pilot section 108 is rotated 90 degrees, so as to appear in the same plane as the main piston 104, for ease of description. The exemplary embodiment actually has pilot spool valve 108 in a plane that is orthogonal (transverse) to the longitudinal axis of the main piston 104. (However, one of ordinary skill in the art would understand that an oscillator in accordance with the invention may also be designed in which the pilot spool is located in the same plane as the main piston—such an oscillator could be substantially as shown in FIGS. 7 and 8).

FIG. 7 shows oscillator 100 at the instant when piston 104 is completely retracted, just before the pilot spool 108b is moved to its far left position. Pressurized fluid enters at port P and flows to chamber 108c. Within chamber 108c, the fluid applies pressure to two opposed faces 108m, 108n of spool 108b on the left and right sides of chamber 108c, respectively; these two pressure forces add up to zero net force. Thus, the pressure in chamber 108c does not tend to move spool 108b in either direction, chamber 108c communicates with passage 110d, and the pressurized fluid is applied through passage 110d, through tube 118 and passage 112c to annular region 104k. The fluid in region 104k passes through holes 102d into the bore 102a of cylinder 102. This applies a force on the left pressure face 104h of piston 104. Chamber 108d is coupled to tank. With spool 108b in its rightmost position, chamber 108d is in communication with passage 110s, so that the annular region 104l on the right end of cylinder 102 is in communication with tank. Any pressure on the right (second) pressure face 104i of piston 104 is released to tank. The net force on piston 104 at this point in the cycle moves piston 104 to the right.

In FIG. 7, the pressurized fluid is also transmitted from chamber 108c, via passage 110p (shown as a dashed line in FIG. 7), to groove 110j. Groove 110j transmits the fluid through logic hole 106d, and into passage 106a of logic tube 106. At the instant when piston 104 is fully retracted, logic hole 106e of passage 106a and logic hole 106h of passage 106b are aligned with groove 104c, completing the fluid path between passage 106a and passage 106b (Note that at all times in the period of oscillator 100, except when oscillator is completely retracted or completely extended, there is a blocked path between passage 106a and passage 106b, and hence no flow through logic passages 106a and 106b). Passage 106b communicates with logic hole 106i, which opens into logic groove 110k. Groove 110k is connected to passage 110q (shown as a dashed line in FIG. 7), which in turn connects to right pilot chamber 108e. Within chamber 108e, pressure builds up on the right face 108k of spool 108b. Meanwhile, pressurized fluid which had previously been in left chamber 108f has bled out to tank through end chamber 108i and bleed orifice 108j. Thus there is a net pressure force pushing spool 108b to the left due to the force on face 108k.

Spool 108b is tripped and shifts to the left position (This spool position is shown in FIG. 8). When spool 108b moves to the left, fluid in left end chamber 108f bleeds out through end passage 108i and orifice 108j. Bleed orifice 108j limits the flow from end chamber 108f, so that spool 108b does not cause a shock when it trips.

When spool 108b shifts to the left position, pressurized fluid builds up in passage 110s. The pressurized fluid flows into annular region 104l, through holes 102f, into the chamber adjacent to face 104i of piston 104. Fluid continues to flow into chamber 108c, passage 110d, through tube 118, passage 112c, annular region 104k, holes 102d, and bore 104b of cylinder 102. The pressure bearing area of face 104i is twice that of face 104h, so that piston 104 begins to move to the left. Once piston 104 begins to extend, logic holes 106d, 106e, 106f, 106g, 106h, and 106i are not aligned with either logic groove 104c or 104d; logic holes 106d–106i are blocked by the inner wall of bore 104b. There is no flow through passages 106a–106c in between the fully retracted position of piston 104 and the fully extended position of piston 104. Because no pressurized fluid is transmitted to right end chamber 108e at this time, the fluid in chamber 108e and end passage 108g bleed out through bleed orifice 108h to tank. Meanwhile, pilot spool 108b remains in the left position until piston 104 is in the fully extended position shown in FIG. 8.

When piston 104 approaches its fully extended position, the outer circumference 104j of piston 104 covers up holes 102d (FIG. 5), but leave holes 102e open. This reduces the total orifice area admitting fluid between annular region 104k and the inner bore 102a of cylinder 102. This begins to slow down the leftward movement of piston 104, to avoid a shock when piston 104 reaches the fully extended position and changes direction. Thus, a "hydraulic cushion" is formed. Further, the left pressure face 104h of piston 104 is cushioned by urethane spring damper 126a, to smoothly decelerate piston 104 and avoid shock when piston 104 fully extends. A smooth sinusoidal motion of piston 104 is thus made possible.

FIG. 8 shows oscillator 100 at the time when piston 104 is fully extended, just before pilot spool 108b shifts again. At the instant when piston 104 is fully extended, logic hole 106e of passage 106a and logic hole 106f of passage 106c are aligned with groove 104d, completing the fluid path between passage 106a and passage 106c. Passage 106c communicates with logic hole 106g, which opens into logic groove 110l. Groove 110l is connected to passage 110r (shown as a dashed line in FIG. 8), which in turn connects to left pilot chamber 108f. Within chamber 108f, pressure builds up on the left face 108l of spool 108b. Meanwhile, pressurized fluid which had previously been in right chamber 108e has bled out to tank through end chamber 108g and bleed orifice 108h. Thus there is a net pressure force pushing spool 108b to the right due to the force on face 108l. Spool 108b is tripped and shifts to the right position (This position of pilot spool 108b is shown in FIG. 3).

When pilot spool 108b moves to the right position, chamber 108d is again in communication with passage 110s, so that the annular region 104l on the right end of cylinder 102 is in communication with tank. Any pressure on the right (second) pressure face 104i of piston 104 is released to tank. The net force on piston 104 at this point in the cycle moves piston 104 to the right. As piston 104 retracts, fluid (if any) within the inner bore 104b of piston 104 drains out through a fluid path consisting of passage 106j, logic hole 106k, logic groove 110m, and passage 110o (FIG. 4). Once piston 104 leaves the fully extended position, logic holes 106d–106i are blocked by the wall of bore 102a. There is no flow through passages 106a–106c in between the fully extended position of piston 104 and the fully retracted position of piston 104. Because no pressurized fluid is transmitted to left end chamber 108f at this time, the fluid in chamber 108f and end passage 108i bleed out through bleed orifice 108j to tank. Meanwhile, pilot spool 108b remains in the right position until piston 104 is in the fully retracted position shown in FIG. 7.

When piston 104 approaches its fully retracted position, the outer circumference 104j of piston 104 covers up holes 102f (FIG. 5), but leave holes 102g open. This reduces the total orifice area admitting fluid between annular region 104l and the inner bore 102a of cylinder 102. This begins to slow down the rightward movement of piston 104, to avoid a shock when piston 104 reaches the fully retracted position and changes direction. Thus, an effective "hydraulic cushion" is formed. Further, the right pressure face 104i of piston 104 is cushioned by urethane spring damper 126b, to smoothly decelerate piston 104 and avoid shock when piston 104 fully retracts. When piston 104 reaches the fully retracted position, the cycle of motion for oscillator 100 is complete, and oscillator 100 is again in the position shown in FIG. 7.

Additional cushion may be provided hydraulically, by (1) transmitting fluid to the left pressure face 104h of piston 104 just before piston 104 reaches the fully extended position, to slow down the movement of piston 104 before it reaches the extended end of its stroke; and (2) transmitting fluid to the right pressure face 104i of piston 104 just before piston 104 reaches the fully retracted position, to slow down the movement of piston 104 just before it reaches the retracted end of its stroke.

Essentially, this is an adjustment to the timing of application of fluid to the pressure faces of piston 104, and is implemented by reversing the direction of the reversible pilot 108 just before the piston reaches either its extended or retracted limit of travel. Thus, instead of reversing the direction of pilot valve 108 when the piston is exactly fully extended, the direction of pilot valve 108 may be reversed when the pilot valve is approximately fully extended. Similarly, instead of reversing the direction of pilot valve 108 when the piston is exactly fully retracted, the direction of pilot valve 108 may be reversed when the pilot valve is approximately fully retracted.

This timing change may be effected by changing the position of the holes (e.g., 106e, 106f and 106h) of logic tube 106 and/or undercuts 104c and 104d of piston 104. For example, moving hole 106e towards body 110 or moving undercut 104d away from body 110 would reverse the direction of pilot valve 108 before piston 104 is fully extended. Similarly, moving undercut 104c towards body 110 would reverse the direction of pilot valve 108 before piston 104 is fully retracted.

It is apparent that moving logic tube hole 106e affects the timing of reversal during retraction, as well as extension. To provide greater flexibility in adjusting the timing of pilot reversal, it may be preferable to add a second longitudinal pressure passage through logic tube 106. According to this variation, one passage transmits fluid under pressure while piston 104 is extending, and the other passage transmits fluid under pressure while piston 104 is retracting. This makes it easier to implement the timing changes completely within the logic tube 106, because the holes in one passage can be moved towards body 110 at the same time that the holes in the other passage moved away from body 110. This configuration is shown in the logic tube of the exemplary dual oscillator 200, which is described below.

II. DUAL HYDRAULIC OSCILLATOR

Figure 10:
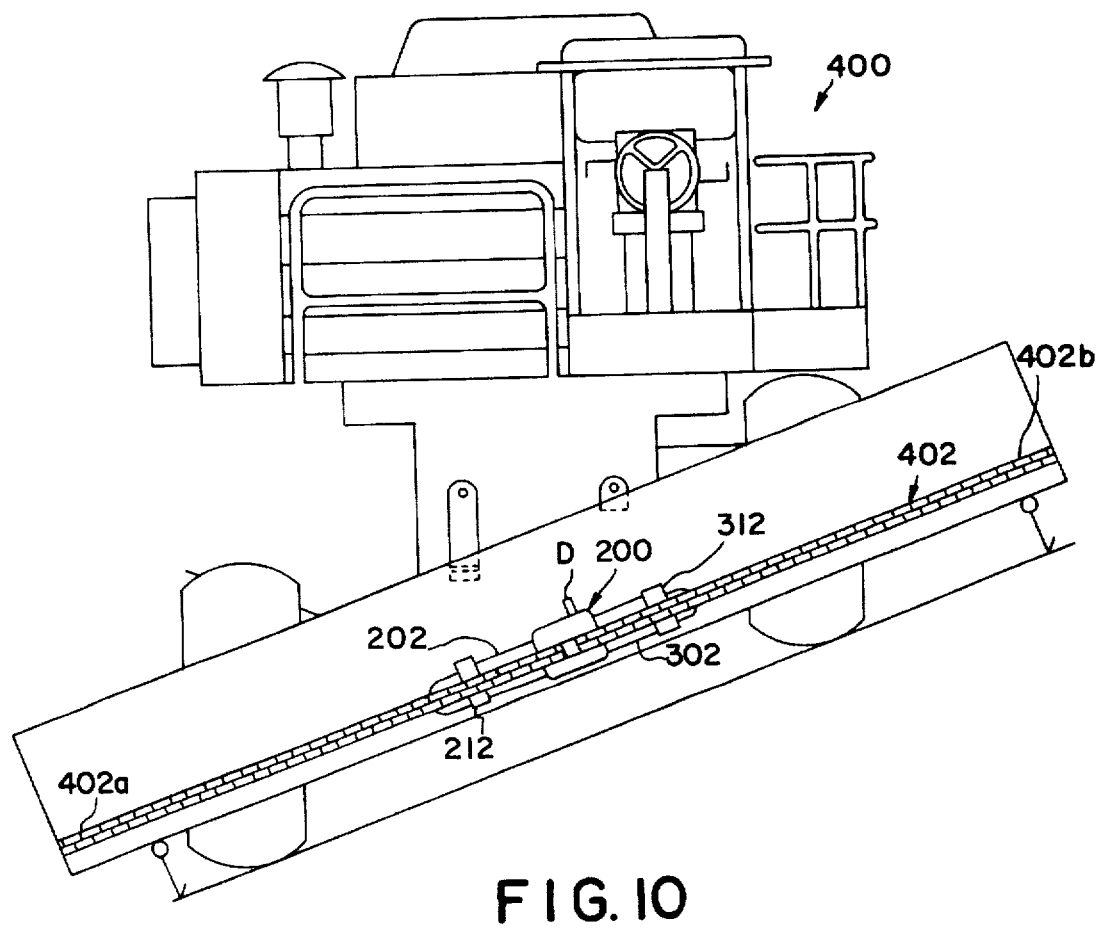
FIG. 10 is a front elevation view of an agricultural harvester having a cutter bar actuated by a dual oscillator according to a second aspect of the invention.

FIG. 10 shows an agricultural harvester 400. Harvester 400 has a large cutter 402 that may measure up to about 32 feet or more. Cutter 402 is divided into two sections 402a and 402b. Each section 402a and 402b is driven by a respective piston 204 and 304 (shown in FIGS. 11A and 11B) of a dual oscillator 200. The movable portions of cutter halves 402a and 402b move in opposite directions. Dual oscillator 200 is advantageous, because the impulses imparted onto the vehicle 400 by the two opposing pistons 204 and 304 tend to cancel each other out, so long as synchronization is maintained between the pistons 204 and 304.

Figure 15:
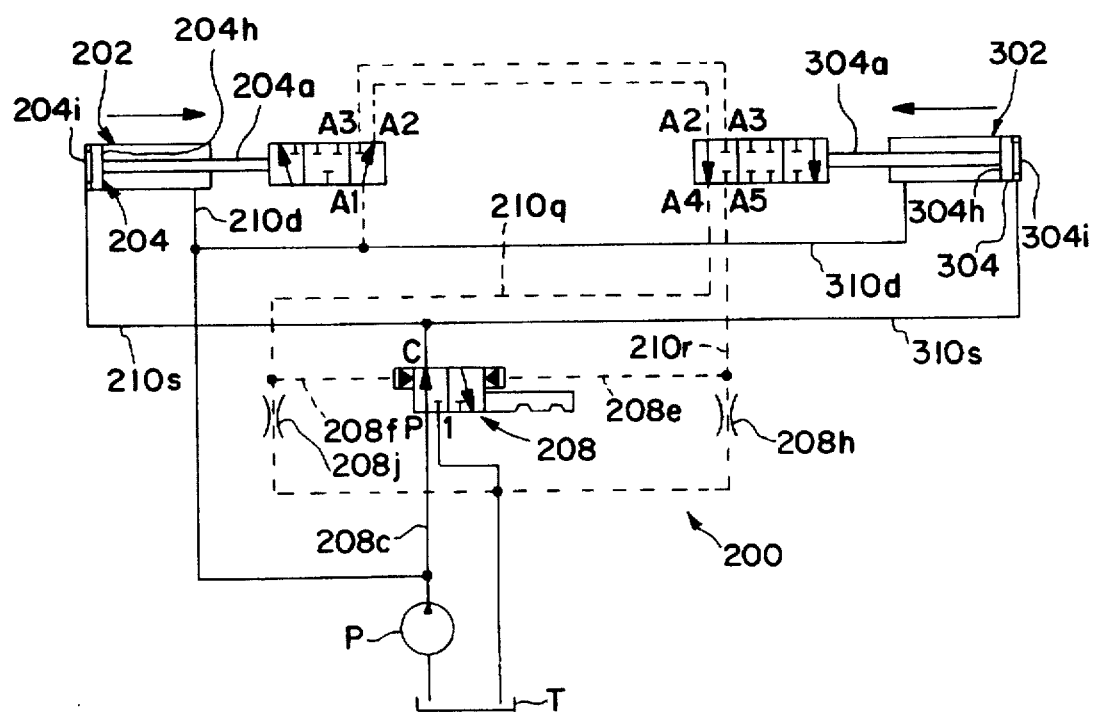
FIG. 15 is a schematic diagram of the dual oscillator of FIG. 11A when the cylinder begins to extend.
Figure 16:
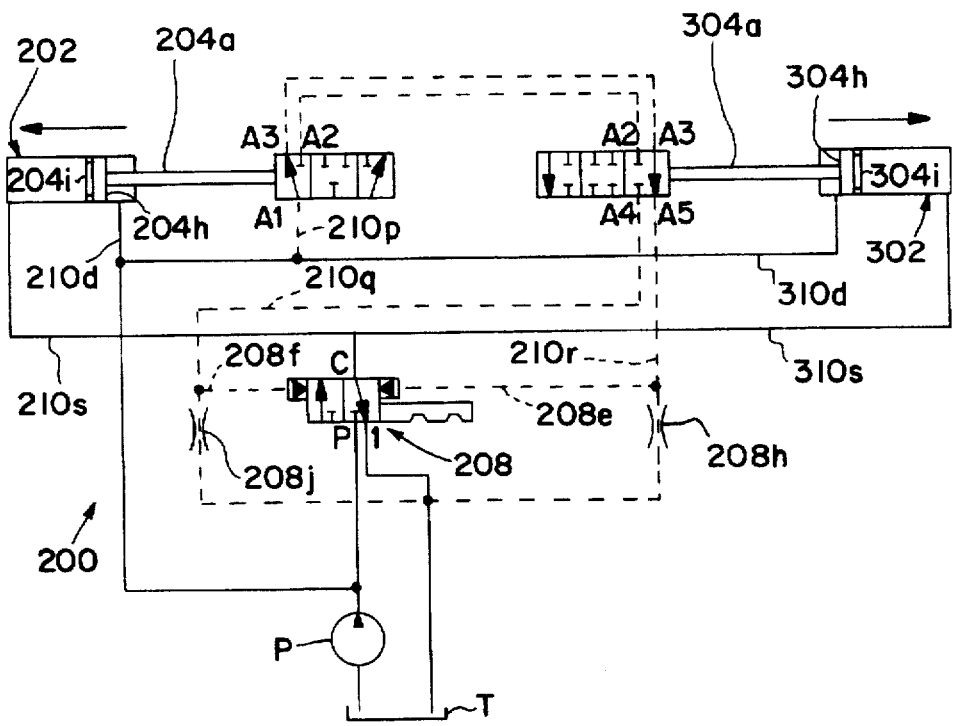
FIG. 16 is a schematic diagram of the dual oscillator of FIG. 11B when the cylinder begins to retract.

FIGS. 15 and 16 are schematic diagrams of a dual hydraulic oscillator. In dual oscillator 200, motion is produced by the simultaneous extension of each of opposing hydraulic cylinder rods (shafts) 204a, 304a, followed by their simultaneous retraction. The rod 304a of the second hydraulic cylinder 302 travels along the same axis, but in the opposite direction to the motion of the first rod 204a. A pilot valve 208 acts as a switch: either to extend or retract the cylinder rods 204a, 304a. In the fully extended position (FIG. 16), pilot valve 208 trips to the retract setting, redirecting fluid so the rods 204a, 304a retract. In the fully retracted position (FIG. 15), pilot valve 208 trips again and reroutes the pressurized fluid to extend the rods 204a, 304a. According to the invention, the movements of the two cylinder rods 204a, 304a are resynchronized every half cycle.

As shown in FIGS. 15 and 16, oscillator 200 comprises three sections: a direction control valve 208 and two single rod, double acting hydraulic cylinders 202 and 302. FIG. 15 shows the system state when the cylinders begin to extend. Pressurized fluid is constantly transmitted via passage 210d to side 204h of piston 204, and fluid is constantly transmitted via passage 310d to side 304h of piston 304. This flow applies a force tending to cause pistons 204 and 304 to retract.

A control valve 208 controls the flow of pressurized fluid to the second side 204i of piston 204 via passage 210s, and flow to the second side 304i of piston 304 via passage 310s. In the position shown in FIG. 15, control valve 208 provides fluid to cause extension of pistons 204 and 304. The area of sides 204i and 304i is greater than the area of sides 204h and 304h (In the exemplary embodiment, the ratio of areas 204i:204h is 2:1, and the ratio of areas 304i:304h is 2:1). Thus, in the state shown in FIG. 15, a greater force is applied to sides 204i and 304i, causing pistons 204 and 304 to extend.

Control of valve 208 is effectuated by the pilot control passages 210q and 210r. These ports are designated A1–A5 in FIGS. 15 and 16. In the exemplary embodiment, these ports are determined by the holes in a logic tube 206 (described below with reference to FIGS. 12–14), which are equal. The effect is that the same force is applied to shift pilot 208 in either direction.

Bleed orifices 208h and 208j couple the control passages 210q and 210r to tank while pilot valve 208 is in between positions.

FIG. 16 shows dual oscillator 200 after control valve 208 has tripped to the reverse position. Pressurized fluid is still constantly transmitted via passage 210d to side 204h of piston 204, and fluid is constantly transmitted via passage 310d to side 304h of piston 304.

Control valve 208 now controls the flow to couple the second side 204i of piston 204 to tank via passage 210s, and to couple the second side 304i of piston 304 to tank via passage 310s. The pressure forces applied to sides 204h and 304h are no longer opposed by application of pressurized fluid to the other sides (204i and 304i) of pistons 204 and 304, so that the pistons 204 and 304 retract.

Dual oscillator 200 may be particularly useful in larger systems. For example, a single oscillator 100 (FIGS. 1–9) may be used in an agricultural harvester cutter up to about 21 feet (about seven meters) in length, but dual oscillator 200 may be preferred for a large cutter (which may be about 32 feet long or larger).

STRUCTURE

Figure 11B:
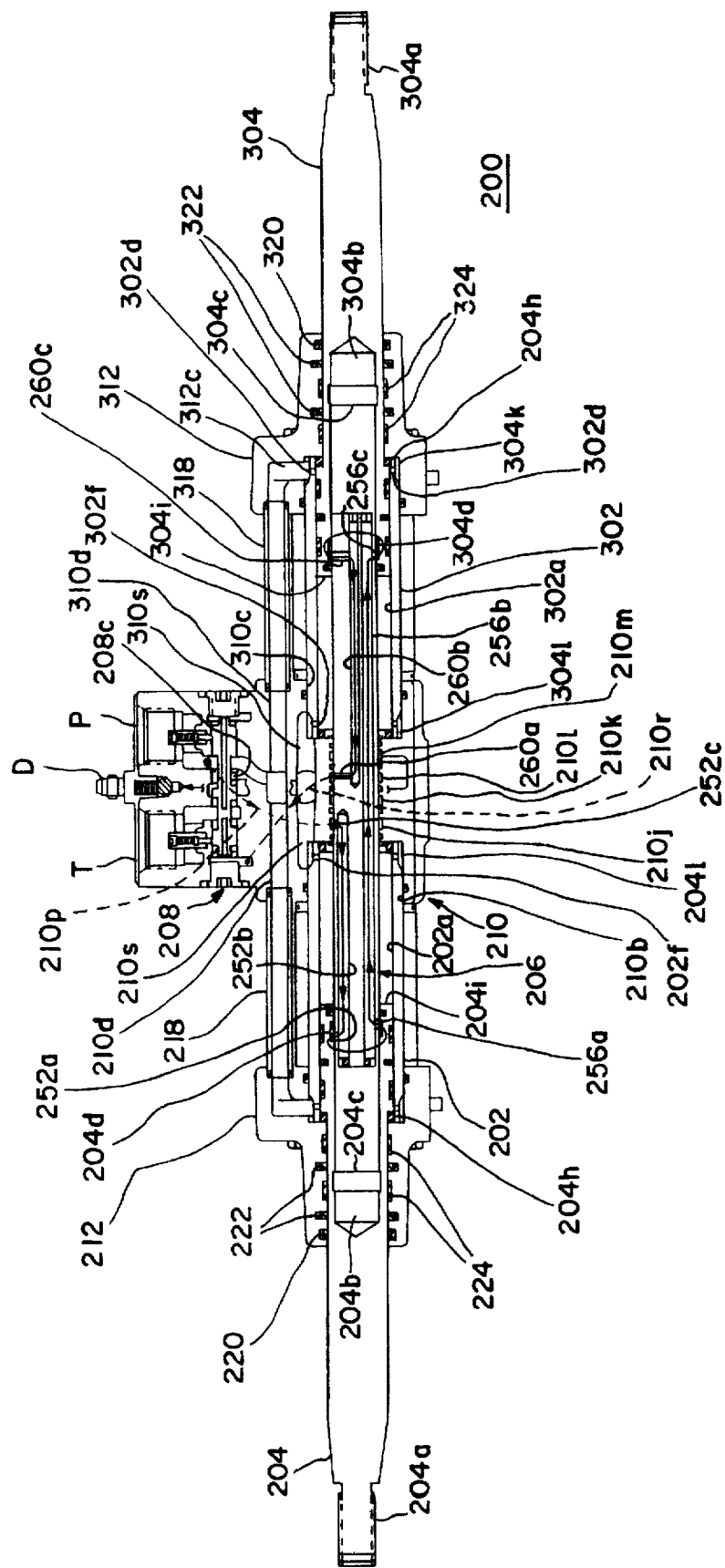
FIG. 11B is a logic diagram showing the operation of the dual oscillator of FIG. 11A, with the pistons extended.

FIGS. 11A and 11B are logic diagrams of an example of the dual hydraulic oscillator 200 shown in FIGS. 15 and 16. The motion produced by oscillator 200 is the simultaneous extension of each of the opposing hydraulic cylinder pistons 204 and 304, followed by their simultaneous retraction. Advantageously, this exemplary embodiment of the invention provides for resynchronization of the two pistons 204 and 304 every half cycle of dual oscillator 200, as described below.

In FIGS. 11A and 11B, the pilot section 208 is shown as being rotated into the plane of the cylinders 202 and 302. One of ordinary skill in the art would understand that the exemplary pilot 208 is actually constructed to be orthogonal to the plane of cylinders 202 and 302.

Exemplary dual oscillator 200 may be constructed using the same components as single oscillator 100, with two exceptions: a modified body 210 and a different logic tube 206 are used, as described in detail below. All other components of dual oscillator 200 are identical to the parts in single oscillator 100. The hydraulic cylinders and pistons are similar for the right and left sides of the dual oscillator, except that the dimensions of the piston grooving may differ between the two sides.

For ease of understanding, reference numerals in FIGS. 11A and 11B have the same last two digits as the corresponding identical items in FIGS. 1–9 (e.g., cylinder 202, piston 204, logic tube 206, etc.). Also, except for the body 210 and pilot 208 portion, dual oscillator 200 is completely left-right symmetrical. Also, for ease of understanding, the reference numeral of a component in the right actuator has the same last two digits as the corresponding component in the left actuator (e.g., left cylinder 202 and right cylinder 302, left piston 204 and right piston 304, etc.). The structure of body 210 and logic tube 206, and the operation of dual oscillator 200 are described in detail herein. The structure of the other components is the same as described above with respect to FIGS. 1–9, and is not repeated herein.

Body 210 is similar to body 110 of single oscillator 100, except that two additional passages 310d and 310s are provided to provide pressurized fluid to the pressure faces 304h and 304i of right piston 304. Passage 310d constantly provides pressurized fluid to the outer face 304h of piston 304 via through tube 318, passage 312c, annular region 304k, holes 302d, and cylinder inner bore 302b, just as passage 210d constantly provides pressurized fluid to the outer face 204h of piston 204 via through tube 218, passage 212c, annular region 204k, holes 202d, and cylinder inner bore 202b.

Passage 310s provides pressurized fluid to the second pressure face 304i of piston 304 via annular region 304l, holes 302f, and the inner bore 302a of cylinder 302. Similarly, passage 210s provides pressurized fluid to the second pressure face 204i of piston 204 via annular region 204l, holes 202f, and the inner bore 202a of cylinder 202.

Other than the two passages 310d and 310s, body 210 is configured identically to body 110 of FIGS. 1–9. Notably, counterbore 310c in body 210 is similar to counterbore 210b; except that the piston grooves may differ between the two sides.

FIGS. 12–14 show the logic tube 206 used in dual oscillator 200. Logic tube 206 includes paths to define fluidic logic circuits which resynchronize pistons 204 and 304 every half cycle. Logic tube 206 has five logic passages 252b, 254b, 256b, 258b, 260b and a drain passage comprising passages 262b$_1$ and 262b$_2$. These passages all run parallel to the longitudinal axis of logic tube 206.

A first passage 252b has logic holes 252a and 252c. Logic hole 252c connects passage 252b to logic groove 210j, which is (at all times) coupled to the pressurized fluid via passage 210p. Logic hole 252a is aligned with logic groove 204c when piston 204 is in the retracted position (FIG. 11A), and is aligned with logic groove 204d when piston 204 is in the extended position (FIG. 11B). Logic hole 252a is blocked by the inner surface of piston 204 when piston 204 is in all other positions.

Logic passage 254b has logic holes 254a and 254c. Logic hole 254a connects passage 254b to logic groove 204c, and logic hole 254c connects passage 254b to logic groove 304c, when pistons 204 and 304 are both in the retracted position. Logic holes 254a and 254c are both blocked by the inner surfaces of pistons 204 and 304, respectively, when pistons 204 and 304 are in all other positions.

Logic passage 256b has logic holes 256a and 256c. Logic hole 256a connects passage 256b to logic groove 204d, and logic hole 256c connects passage 256b to logic groove 304d, when pistons 204 and 304 are in the extended position (FIG. 11B). Logic holes 256a and 256c are both blocked by the inner surfaces of pistons 204 and 304 respectively, when pistons 204 and 304 are in all other positions.

Logic passage 258b has logic holes 258a and 258c. Logic hole 258a connects passage 258b to logic groove 210k, which is (at all times) coupled to the right pilot end chamber 208e via passage 210q (shown as a dashed line in FIG. 11A). Logic hole 258c is aligned with logic groove 304c when piston 304 is in the retracted position (FIG. 11A). Logic hole 258c is blocked by the inner surface of piston 304 when piston 304 is in all other positions.

Logic passage 260b has logic holes 260a and 260c. Logic hole 260a connects passage 260b to logic groove 210l, which is (at all times) coupled to the left pilot end chamber 208f via passage 210r (shown as a dashed line in FIG. 11B). Logic hole 260c is aligned with logic groove 304d when piston 304 is in the extended position (FIG. 11B). Logic hole 260c is blocked by the inner surface of piston 304 when piston 304 is in all other positions.

Drain passages 262b$_1$ and 262b$_2$ run throughout the length of logic tube 206. Drain passages 262b$_1$ and 262b$_2$ are connected to each other by a passage (not shown), so as to effectively form one drain path. Passage 262b$_2$ is connected to hole 262a, which is (at all times) aligned with, and in fluid communication with, drain groove 210m. When pistons 204 and 304 retract, any fluid which may have accumulated within the central bores 104b and 304b of respective pistons 204 and 304 is returned to drain D via the drain passages 262b$_1$ and 262b$_2$.

OPERATION

The operation of dual oscillator will first be described with reference to FIG. 11A. FIG. 11A shows the state of oscillator 200 when both of the pistons 204 and 304 are retracted, just before pilot spool 208b trips and shifts to the left. With the pistons retracted, logic holes 252a and 254a in logic tube 206 both line up with logic groove 204c, completing the fluid circuit path as shown by the arrow. At the other end of logic tube 206, logic holes 254c and 258c both line up with logic groove 304c. As noted above, logic hole 252c is always in communication with the pressure inlet P via passage 210p and logic groove 210j, and logic hole 258a is always in contact with the right end chamber 208e of pilot 208 via passage 210q and logic groove 210k.

As a result, a closed fluid circuit is formed connecting the pressure inlet port P to the right end chamber 208e, via passage 210p, groove 210j, hole 252c, passage 252b, hole 252a, groove 204c, hole 254a, passage 254b, hole 254c, groove 304c, hole, 258c, passage 258b, hole 258a, groove 210k, and passage 210q. Pressure then builds up in end chamber 208e, causing pilot spool 208b to trip. Once the pilot trips, pressurized fluid flows through passages 210s and 310s, into annular regions 204l and 304l, through the cylinder holes into cylinders 202 and 302 and finally to pressure faces 204i and 304i. This causes extension of the cylinders 204 and 304, in the same manner described above in the description of FIG. 7.

According to one aspect of the embodiment of FIG. 11A, the closed circuit between pressure inlet P and right end chamber 208e can only be formed when both pistons 204 and 304 are completely retracted at the same time. If either of the pistons 204 or 304 becomes stuck or slows down for any reason, the fluid circuit remains open until both pistons reach the fully retracted position. Because this path is not formed until both pistons 204 and 304 retract fully, pilot valve 208 does not trip until both pistons reach the fully retracted position. Thus, oscillator 200 automatically resynchronizes the two pistons 204 and 304 every time the pistons are fully retracted (As explained below, resynchronization also occurs whenever both pistons 204 and 304 are fully extended).

As described above, logic holes 252a, 254a, and 256a are blocked by the inside walls of piston 204 while piston 204 is moving in between the fully retracted and fully extended positions. Therefore, the fluid circuit between inlet port P and chamber 208e cannot form if piston 204 is in between the fully retracted and fully extended positions. Similarly, logic holes 254c, 256c, 258c, and 260c are blocked by the inside walls of piston 304 while piston 304 is moving in between the fully retracted and fully extended positions. Therefore, the fluid circuit between inlet port P and chamber 208e cannot form (and pilot 208 cannot trip) if piston 304 is in between the fully retracted and fully extended positions. Thus, the next system state of interest is that shown in FIG. 11B.

FIG. 11B shows the state of oscillator 200 when both of the pistons 204 and 304 are fully extended, just before pilot spool 208b trips and moves to the right. With the pistons extended, logic holes 252a and 256a in logic tube 206 both line up with logic groove 204d, completing the fluid circuit path as shown by the arrow. At the other end of logic tube 206, logic holes 256c and 260c both line up with logic groove 304d. As noted above, logic hole 252c is always in communication with the pressure inlet P via passage 210p and logic groove 210j, and logic hole 260a is always in contact with the left end chamber 208f of pilot 208 via passage 210r and logic groove 210l.

As a result, a closed fluid circuit is formed connecting the pressure inlet port P to the left end chamber 208f, via passage 210p, groove 210j, hole 252c, passage 252b, hole 252a, groove 204d, hole 256a, passage 256b, hole 256c, groove 304d, hole, 260c, passage 260b, hole 260a, groove 210l, and passage 210r. Pressure then builds up in end chamber 208f, causing pilot spool 208b to trip. Once the pilot trips, passages 210s and 310s are placed in communication with tank, releasing pressure from annular regions 204l and 304l, from cylinders 202 and 302 and finally, from pressure faces 204i and 304i. This causes retraction of cylinders 204 and 304, in the same manner described above in the description of the single oscillator FIG. 8.

According to another aspect of the embodiment of FIGS. 11A and 11B, the closed circuit between pressure inlet P and left end chamber 208f can only be formed when both pistons 204 and 304 are completely extended at the same time. If either piston 204 or 304 becomes stuck or slows down, the fluid circuit remains open until both pistons reach the fully extended position. Because this path is not formed until both pistons 204 and 304 extend fully, pilot valve 208 does not trip until both pistons reach the fully extended position. Neither piston retracts until pilot valve 208 trips. Thus, oscillator 200 automatically resynchronizes the two pistons 204 and 304 every time the pistons are fully extended.

The resynchronization feature is important for using the dual oscillator to actuate a relatively large load; failure to maintain synchronization would result in undesirable vibration and resonance problems. The self-synchronization feature allows the dynamic forces present to become re-aligned at the end of each extension and retraction stroke.

APPLICATIONS

As mentioned above, single oscillator 100 and dual oscillator 200 may be used to actuate cutting blades for a variety of applications. These include, but are not limited to, agricultural combines and forage harvesters and grass and weed cutters. These cutters may be used in vehicles which range from relatively small reciprocating cutters intended for use in a golf course (or a large home) to large harvesters weighing several tons. Through the use of seals 120, 122 and wear rings 124 originally developed for aircraft landing struts, oscillators according to the invention can accommodate lateral loads in excess of those supported by any prior art hydraulic oscillator known to the inventor. Thus, the exemplary oscillators can support the weight of the cutter during installation. At the same time, seals 120 and 122 (which are permitted by the use of a central logic tube 106 within the bore of piston 104) ensure low leakage and high efficiency.

It is envisioned that the exemplary oscillator may operate in an environment in which the inlet pressure is about 3000 PSI, with an inlet flow rate between about 22 and 32 gallons per minute. A typical cutter bar is expected to weigh about 20–30 pounds. Oscillators 100 and 200 deliver a high force per stroke, about 1000 pounds dynamic force, with a static force which may be about 1500–3000 pounds. It may be advantageous to include a small accumulator in the system, having a capacity of about three liters (about ¾ gallon).

It is further envisioned that the invention may be used in other types of reciprocating equipment. For example, a single oscillator may be attached to rock drilling equipment for automated drilling (operating at a slower cycle speed than the reciprocating crop cutter bar).

As a further example, an oscillator according to the invention may be used as a driver into a high pressure intensifier.

Still further examples may include the use of an oscillator according to the invention to driver the reciprocating motion of a hydraulic hammer or pile driver.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A fluid control system comprising:

first and second pistons oriented in opposite directions;

a reversing piloted valve for controlling flow of pressurized fluid to alternately extend and retract both of the first and second pistons;

means for synchronizing the extension of the first and second pistons, and means for synchronizing the retraction of the first and second pistons, wherein the extension synchronizing means include a first fluid path for applying pressurized fluid to reverse the operation of the piloted valve, said first fluid path being blocked unless the first and second pistons are both simultaneously in an approximately retracted position.

2. A fluid control system according to claim 1, wherein the retraction synchronizing means include a second fluid path for applying pressurized fluid to reverse the operation of the piloted valve, said second fluid path being blocked unless the first and second pistons are both simultaneously in an approximately extended position.

3. A fluid control system according to claim 2, wherein the first and second fluid paths pass through a central logic tube, said central logic tube having first and second ends slidably received in said first and second pistons, respectively.

4. A fluid control system according to claim 1, wherein each piston reciprocates within a respective cylinder, and an outer circumferential surface of each piston is sealed to prevent leakage of the fluid between the ends of the respective cylinder in which that piston reciprocates.

5. A fluid control system according to claim 1, wherein said piloted valve is a three position spool valve.

6. A fluid control system according to claim 1, further comprising a body housing said piloted valve, said piloted valve being positioned transverse to a longitudinal axis of each piston.

7. A cutter bar assembly for an agricultural harvester, comprising a fluid control system according to claim 1, and first and second reciprocating cutters, each cutter actuated by a respective one of said first and second pistons.

8. A fluid control system comprising:

first and second pistons oriented in opposite directions;

a reversing piloted valve for controlling flow of pressurized fluid to alternately extend and retract both of the first and second pistons;

means for synchronizing the extension of the first and second pistons, and means for synchronizing the retraction of the first and second pistons, wherein the retraction synchronizing means include a fluid path for applying pressurized fluid to reverse the operation of the piloted valve, said fluid path being blocked unless the first and second pistons are both simultaneously in an approximately extended position.

9. A fluid control system according to claim 8, wherein each piston reciprocates within a respective cylinder, and an outer circumferential surface of each piston is sealed to prevent leakage of the fluid between the ends of the respective cylinder in which that piston reciprocates.

10. A fluid control system according to claim 8, wherein said piloted valve is a three position spool valve.

11. A fluid control system according to claim 8, further comprising a body housing said piloted valve, said piloted valve being positioned transverse to a longitudinal axis of each piston.

12. A cutter bar assembly for an agricultural harvester, comprising a fluid control system according to claim 8, and first and second reciprocating cutters, each cutter actuated by a respective one of said first and second pistons.

* * * * *

UNITED STATES PATENT AND TRADEMARK OFFICE
CERTIFICATE OF CORRECTION

PATENT NO. : 5,787,786
DATED : Aug. 4, 1998
INVENTOR(S) : Zeuner

It is certified that error appears in the above-identified patent and that said Letters Patent is hereby corrected as shown below:

On the title page item [56], References Cited, Page 2, should read as follows 5,787,786
Page 2

U.S. PATENT DOCUMENTS

| Number | Date | Name |
|---|---|---|
| 3,873,159 | 3/1975 | Dabell et al. |
| 3,897,975 | 8/1975 | Cobb et al. |
| 4,052,107 | 10/1977 | Hay |
| 4,080,000 | 3/1978 | Paurat |
| 4,120,202 | 10/1978 | Range et al. |
| 4,121,499 | 10/1978 | Hay |
| 4,147,228 | 4/1979 | Bouyoucos |
| 4,165,042 | 8/1979 | Peterson |
| 4,259,029 | 3/1981 | Koehl |
| 4,280,396 | 7/1981 | Zeuner et al. |
| 4,363,519 | 12/1982 | Howard |
| 4,391,414 | 7/1983 | Reiter |
| 4,550,785 | 11/1985 | Hibbard et al. |
| 4,554,624 | 11/1985 | Wickham et al. |
| 4,580,640 | 4/1986 | Boldt |
| 4,688,439 | 8/1987 | Cureton et al. |
| 4,891,115 | 1/1990 | Shishkin et al. |
| 4,900,093 | 2/1990 | Krone et al. |
| 5,048,394 | 9/1991 | McLevige et al. |
| 5,113,966 | 5/1992 | Gregory et al. |
| 5,145,279 | 9/1992 | Larcheron et al. |
| 5,158,048 | 10/1992 | Robnett et al. |
| 5,248,123 | 9/1993 | Richeson et al. |
| 5,273,217 | 12/1993 | Bartels et al. |
| 5,408,768 | 4/1995 | Karani |

Signed and Sealed this

Fifth Day of January, 1999

Attest:

*Attesting Officer*

*Acting Commissioner of Patents and Trademarks*